United States Patent [19]

Emmert

[11] 4,127,880

[45] Nov. 28, 1978

[54] TAPE RECORDER WITH COUPLING BETWEEN THE RECORDING-SWITCH AND SOUND-LEVEL REGULATOR

[75] Inventor: Reinhold Emmert, Fuerth, Germany

[73] Assignee: GRUNDIG E. M. V. Elektro-Mechanische Versuchsanstalt, Fuerth, Germany

[21] Appl. No.: 815,195

[22] Filed: Jul. 13, 1977

[30] Foreign Application Priority Data

Feb. 14, 1977 [DE] Fed. Rep. of Germany ....... 2635002

[51] Int. Cl.² .......................... G11B 5/02; G11B 15/04
[52] U.S. Cl. ......................................... 360/68; 360/60
[58] Field of Search .................... 360/61, 137, 60, 67, 360/68; 338/172, 191, 198, 200; 200/18, 5 R

[56] References Cited

U.S. PATENT DOCUMENTS

| | | | |
|---|---|---|---|
| 2,909,617 | 10/1959 | Shields | 360/60 |
| 3,047,825 | 7/1962 | Biltz | 338/172 |
| 3,721,774 | 3/1973 | Yonemoto et al. | 360/61 |
| 3,889,088 | 6/1975 | Zdanys et al. | 200/18 |
| 3,952,330 | 4/1976 | Rimkus et al. | 360/61 |

*Primary Examiner*—Vincent P. Canney
*Attorney, Agent, or Firm*—Kane, Dalsimer, Kane, Sullivan, and Kurucz

[57] ABSTRACT

A tape recorder with combined on/off and sound regulating switch having means whereby when said tape recorder is turned on a variable resistor exhibits maximum resistance and thereafter returns to minimum resistance so that transient noise pulses are not recorded.

9 Claims, 6 Drawing Figures

TAPE RECORDER WITH COUPLING BETWEEN THE RECORDING-SWITCH AND SOUND-LEVEL REGULATOR

BACKGROUND OF THE INVENTION

It has not been possible to provide in a tape-recorder, and especially in a cassette tape recorder, a simple means to interrupt or terminate the recording while the tape is running without recording noise. In certain instances, the mechanical noises which come from the unit itself and which are created by the operation of the "pause" or stop switch are recorded on the tape by the microphone which is built into the unit. Also even with the use of modest recorders it is often desired that the text spoken between the music during a recording of radio broadcasts be excluded without recording the switch noises.

Arrangements are available in high priced recorders to prevent these undesirable cracking noises from being recorded through the use of complicated electronic circuits which can slowly phase out the source of the sound, such as microphone, radio-receiver, etc., in or out.

In lower priced units it has been recommended that the user regulate the sound-level together with the recording-switch however, no suitable mechanical coupling between the recording-switch and the sound-level regulator has been provided.

SUMMARY OF THE INVENTION

In order to solve the problems heretofore encountered the subject invention provides control of a variable resistor in the sound-level regulator by a control bar. This also initiates the start of the recording. By movement of the control bar the variable resistor regulates the recording current to zero. Upon release of the control bar, it moves back into its rest position by force of a spring. Upon return of the control bar to rest position the coupled variable resistor is also brought back to the position of full strength recording current.

A knob is provided which is connected to the control bar which control bar is a slide bar connected to the variable resistor. The recording switch is operated by an on-off bar which is also moved by the knob.

DESCRIPTION OF THE INVENTION

Figure 1:
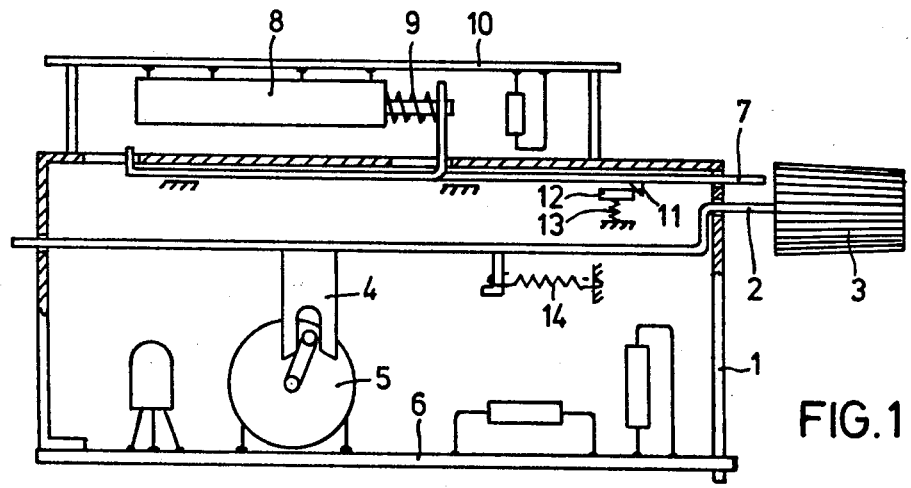
FIG. 1 is a segmentary view of the tape recorder in the non-recording mode and with the control bar in normal position.

A tape recorder is shown in the FIGS. having a chassis or frame 1 in which control bar 2 is inserted. The control bar 2 is in the form of a slide bar. At the end of the control bar 2 which extends outwardly of the frame 1 knob 3 is attached by a press fit. A fork 4, integral with slide bar 2 depends therefrom within the frame and engages the crank pin of variable resistor 5 which is the sound level regulator inserted in the circuit of printed circuit board 6 in the embodiment shown herein. In the preferred embodiment the variable resistor is in the recording circuit of the sound head and wired in series after the recording amplifier.

Tension apring 14 locates the control bar 2 and knob 3 in the normal outer position shown in FIGS. 1,3,4 and 6 and yieldingly urges the knob into this position. The on-off actuating slide bar 7 is similarly supported in frame 1 and is permanently connected to the operating arm of recording switch 8 which is fixedly mounted to the frame. The spring 9 yieldingly urges actuating slide bar 7 to a normally outward position similar to that of slide bar 2 and shown in FIGS. 1 and 4.

In the present embodiment the recording switch 8 is attached to a separate wiring plate or printed circuit board 10 which in turn is fixed to the frame. It can however be attached to and connected directly with printed circuit board 6.

An arrest mechanism in the form of hook 11 and stop bar 12 which is urged upwardly by spring 13 to engage the hook 11 is provided for actuating slide bar 7. When the hook 11 is engaged by the bar 12, the slide bar 7 is arrested in the position shown in FIGS. 2,3,5, and 6 against the action of spring 9.

Figure 2:
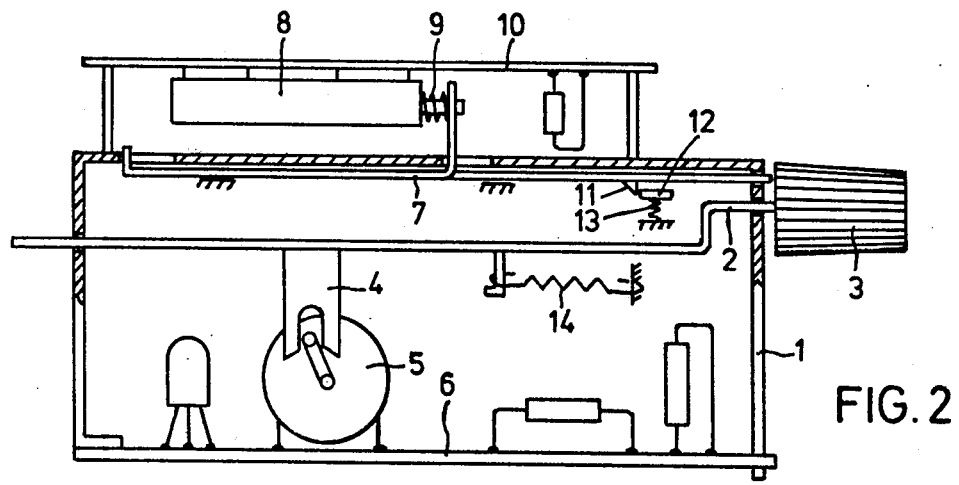
FIG. 2 is a view similar to FIG. 1 with the tape recorder in the recording mode but prior to the return of the control bar to normal position and with the variable resistor of the sound level regulator in zero current position.
Figure 3:
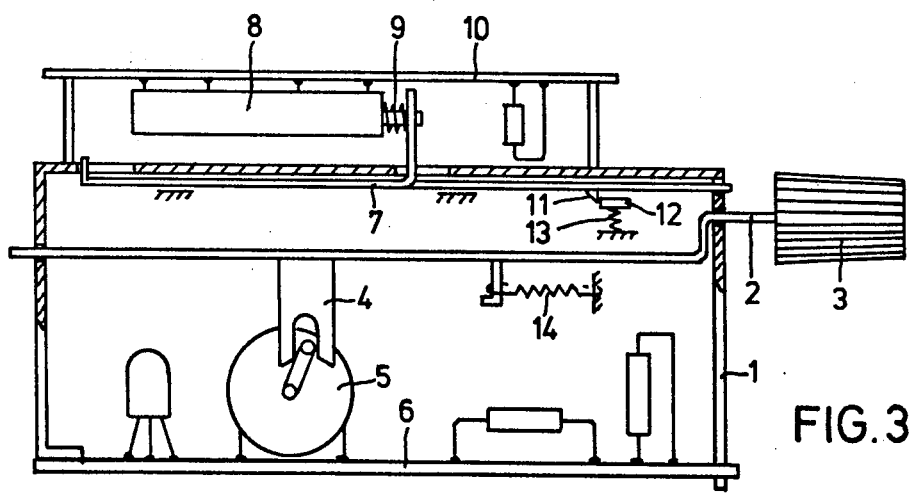
FIG. 3 is a view similar to FIG. 2 with the tape recorder in the recording mode and after return of the control bar to normal position and with the variable resistor of the sound level regulator in maximum current position.

In operation, movement of the control bar 2 to the left, from the position shown in FIG. 1 to that shown in FIG. 2 moves the on-off slide bar 7 to the left moving the operating arm of recording switch 8 against the force of spring 9 placing the unit in the recording mode. Simultaneously the variable resistor 5 of the sound level regulator is rotated into the zero current position. Release of the knob 3 allows spring 14 to return control bar 2 to its normal position as shown in FIG. 3 rotating the arm of resistor 5 to the maximum current position. Hook 11 of the arrest mechanism engages stop bar 12 maintaining the unit in the recording mode.

It it is desired to exlude a signal during recording without creating undesired noises, the operator has only to push knob 3. The recording mode can be shown by an optical indicator as for instance an indicator-lamp. Upon operation of a recording stop key not shown the bar 12 is moved against the resistance of the compression spring 13 out of the hook 11, and the slide bar 7 and the recording switch 8 are moved by the spring 9 into the non recording position shown in FIG. 1, moving control bar 2 as well.

Figure 4:
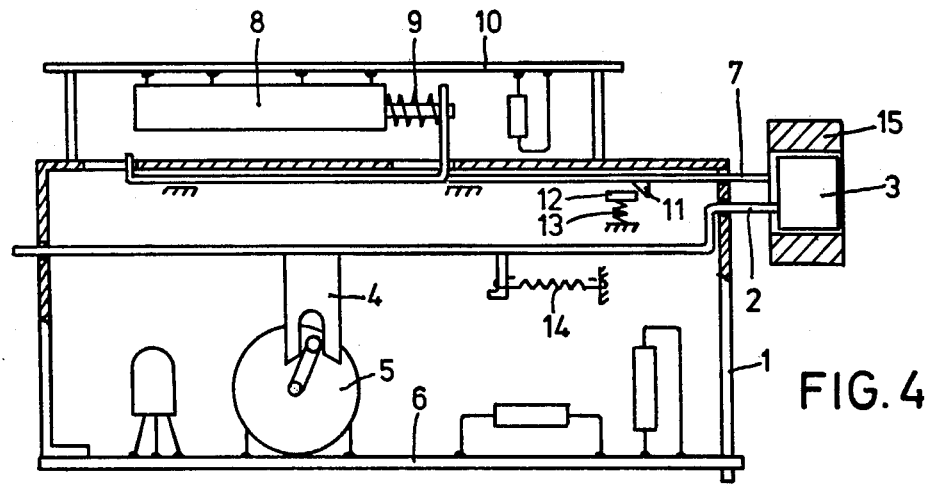
FIG. 4 is a view similar to FIG. 1 of an embodiment of the invention where a mechanical indicator to show the recording mode is added.
Figure 5:
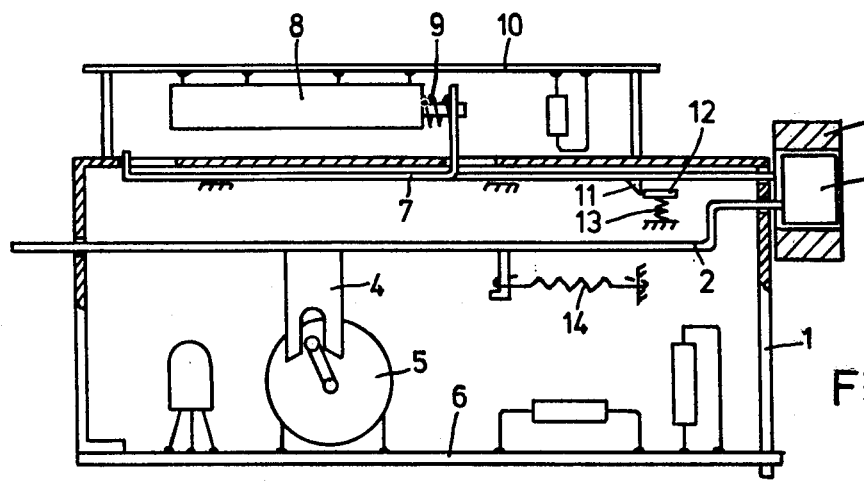
FIG. 5 is a view similar to FIG. 2 of the embodiment of FIG. 4.
Figure 6:
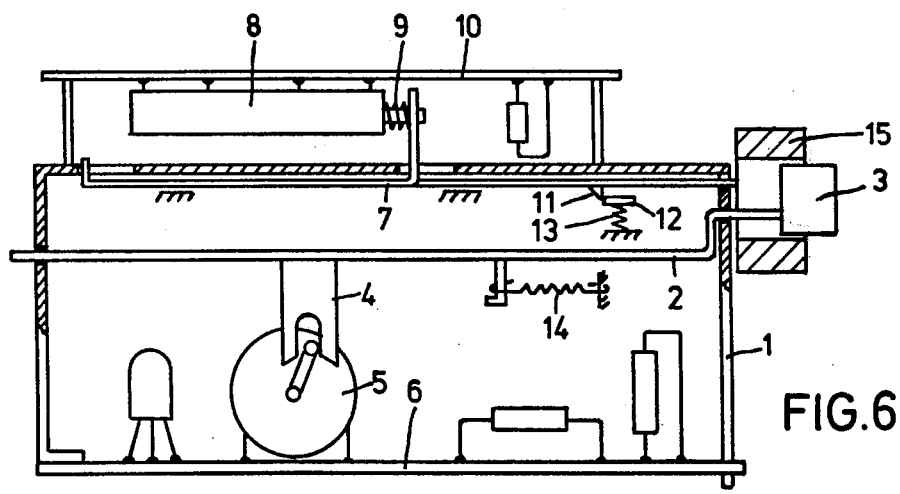
FIG. 6 is a view similar to FIG. 3 of the embodiment of FIG. 4.

FIGS. 4,5, and 6 show a design similar to that of FIG. 1 with the exception of a simple mechanically made indicator to indicate that the unit is in the recording or non recording mode. The outer knob 15 is mounted to the slide bar 7 so, that it surrounds the inner knob 3 so that both parts can be moved simultanously in a simple manner. The knob 3 and the member 15 can also be made as whipping or tilting keys with the corresponding functions or as keys arranged next to each other or above each other.

FIG. 5 shows both the inner knob 3 and the outer knob 15 operated together to move to the left in a view similar to FIG. 2.

FIG. 6 illustrates that upon release of both the inner knob 3 and the outer knob 15 the slide bar 7 is locked and the outer knob 15 therefore remains in depressed position. By this it is visible to the operator, that the tape-recorder is switched for recording. After touching the recording stop key which is not shown, the lock of the slide bar 7 is released and the knob 15 moves back into its outer position. Releasing simultaneously the recording switch 8 and terminating so the recording mode.

In the present embodiment the inner knob 3 is shown in a cylindrical keyway formed in outer knob 15. The keyway can have any desired cross section however it is preferably cylindrical, square or rectangular.

I claim:

1. In a tape recorder a combined on/off and sound regulating switch including:
   (a) a first slide bar movable from a first to a second position,
   (b) a second slide bar connected to a variable resistor, said variable resistor being in the record circuitry,
   (c) said second slide bar being moveable from a first position to a second position thereby changing the resistance of said variable resistor from minimum to maximum,
   (d) first means to move said first and second slide bars from a first position to a second position in unison,
   (e) second means for returning said second slide bar to a first position while maintaining said first slide bar in said position, whereby when said tape recorder is turned on said variable resistor exhibits maximum resistance and thereafter returns to minimum resistance so that transient noise pulses are not recorded.

2. A tape recorder in accordance with claim 1 in which the variable resistor is in the recording circuit of the sound head and wired in series after the recording amplifier.

3. A tape recorder in accordance with claim 1 in which said second means includes a first spring yieldingly urging said second slide bar to the first position thereof whereby upon movement thereof against the force of said first spring said second slide bar is moved to said second position and upon release is returned thereby to said first position.

4. A tape recorder in accordance with claim 3 in which a second spring is provided yieldingly urging said first slide bar to the first position thereof and said second means includes arresting means for arresting and maintaining said first slide bar in said second position upon return of said second slide bar to said first position and release means are provided for said arresting means whereby upon the release thereof said first slide bar can be returned by said second spring to said first position.

5. A tape recorder in accordance with claim 4 in which a first knob is attached to said second slide bar and an outer knob is attached to said first slide bar in operative association with said first knob for coupled movement therewith from said first to said second position and uncoupled movement thereof from said second to said first position.

6. A tape recorder in accordance with claim 5 in which the outer knob is provided with a keyway into which said first knob can be received.

7. A tape recorder in accordance with claim 6 in which said keyway is cylindrical.

8. A tape recorder in accordance with claim 6 in which said keyway is square.

9. A tape recorder in accordance with claim 6 in which said keyway is rectangular.

* * * * *